(12) United States Patent
Gray et al.

(10) Patent No.: US 6,895,533 B2
(45) Date of Patent: May 17, 2005

(54) METHOD AND SYSTEM FOR ASSESSING AVAILABILITY OF COMPLEX ELECTRONIC SYSTEMS, INCLUDING COMPUTER SYSTEMS

(75) Inventors: William M. Gray, Colorado Springs, CO (US); Curtis P. Kolovson, Redwood City, CA (US); Lawrence D. Wiebe, Cupertino, CA (US); Peter M. Piet, Orinda, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 10/104,524

(22) Filed: Mar. 21, 2002

(65) Prior Publication Data

US 2003/0182599 A1 Sep. 25, 2003

(51) Int. Cl.$^7$ ................................................. G06F 11/00
(52) U.S. Cl. .............................. 714/47; 714/25; 714/48
(58) Field of Search ............................... 714/25, 47, 48

(56) References Cited

U.S. PATENT DOCUMENTS

| | | | | |
|---|---|---|---|---|
| 4,970,725 A | * | 11/1990 | McEnroe et al. | 714/25 |
| 6,269,457 B1 | * | 7/2001 | Lane | 714/38 |
| 6,532,426 B1 | * | 3/2003 | Hooks et al. | 702/81 |
| 6,754,843 B1 | * | 6/2004 | Lu et al. | 714/4 |
| 6,810,495 B2 | * | 10/2004 | Castelli et al. | 714/47 |
| 2003/0046615 A1 | * | 3/2003 | Stone | 714/47 |

OTHER PUBLICATIONS

Ross, "A First Course in Probablity", 1998, Prentice Hall, 5th Ed, pp. 431–432.*

* cited by examiner

Primary Examiner—Robert Beausoliel
Assistant Examiner—Timothy M. Bonura

(57) ABSTRACT

A semi-automated availability-assessment system and methodology. A comprehensive questionnaire providing detailed information about the hardware and operating-system components and configuration of a system, application-and-database-software components and configuration of the system, data related to other potential sources of unplanned downtime, and data related to potential sources of planned downtime is received. The information contained in the received questionnaire is processed in several steps. First, hardware and operating-system-component-and-configuration information is extracted in order to conduct a Markov-chain availability analysis of the overall system hardware and operating system to provide a first intermediate result. Application-and-database-software component and configuration information, along with data and estimates related to software component failure and recovery rates, as well as relevant data for other potential sources of unplanned downtime, are extracted from the questionnaire and compiled together to form a second intermediate result. Information related to maintenance and other planned activities that result in planned system downtime are extracted from the questionnaire and compiled together as a third intermediate result. Finally, the intermediate result sets are combined in a deterministic manner to produce a final availability assessment for the system.

16 Claims, 8 Drawing Sheets

METHOD AND SYSTEM FOR ASSESSING AVAILABILITY OF COMPLEX ELECTRONIC SYSTEMS, INCLUDING COMPUTER SYSTEMS

TECHNICAL FIELD

The present invention relates to determining the overall availability of a computer system and, in particular, to a method and system for combining intermediate availability results based on detailed hardware and operating system analysis with intermediate availability results related to various sources of planned and unplanned downtime events, including application and database software, into a composite availability result that represents an estimated availability for the computer system.

BACKGROUND OF THE INVENTION

The present invention is related to determination of the availability of computer systems and other complex electronic systems. These complex systems are logically viewed as collections of cooperating components. Components may include physical hardware components, such as disk drives, disk arrays, busses, networks, processors, and other such physical components. Components may, in addition, include software, including computer operating systems ("OSs"), database management systems ("DBMSs"), commercial server software, communications software, and a wide variety of application programs. In general, system availability is computed from component failure and recovery rates.

FIG. 1 is a graphical representation of the time-dependent operation of a system component. The system component may be in an operational state, corresponding to an instantaneous availability of 1, or may be in a failed state, corresponding to the instantaneous availability of 0. Thus, in FIG. 1, a binary operational state model is employed. It is possible to use intermediate instantaneous availability values between 0 and 1 to indicate intermediate operational states between fully operational and fully failed. However, a reasonable system availability determination can be calculated using a binary state model.

In FIG. 1, the vertical axis 101 represents the availability of the component and the horizontal axis 103 represents time. The component is assumed to be fully operational at time t=0 (105 in FIG. 1). The component continues to be fully operational until a time $t_1$ (107 in FIG. 1), at which point the component fails. Between times $t_1$ and $t_2$ (109 in FIG. 1), the failed component is detected and repaired so that, at time $t_2$, the component again becomes operational. The component remains operational until a subsequent failure at time $t_3$ (111 in FIG. 1). The time interval 113 between time t=0 and time $t_1$, is the time to first failure of the component. The time interval 115 between time $t_1$ and time $t_2$ is the time to repair the component following the first failure of the component. The time interval 117 between time $t_2$ and time $t_3$ is the time to failure for the component following initial repair. In general, the various times to failure for a component are distributed according to some probability distribution function, as are the times to repair the component once it has failed. In one test, the component may fail after 2000 hours of operation, while in a subsequent test, the component may fail after 4000 hours of operation. Thus, the component failure and repair characteristics are often probabilistically represented by the component's mean time to failure ("MTTF") and mean time to repair ("MTTR").

FIG. 2 is a graphical representation of component reliability. In FIG. 2, the vertical axis 101 corresponds to the probability that a component survives, or continues operation, and the horizontal axis 103 corresponds to time. Initially, at time t=0 (105 in FIG. 2), the component is operational. At subsequent times, the probability that the component is still operational or, in other words, has not failed, decreases, initially gradually, then more steeply through inflection point 107, and again more gradually as the probability of survival of the component approaches 0 as time increases towards positive infinity. The reliability of a component at time t is the probability that the component has survived to time t without failing. For example, the reliability $R(t_1)$ of the component at time $t_1$ (109 in FIG. 2) is represented by the y-coordinate of the point 113 at the intersection of a vertical line 111 from time $t_1$ and the reliability curve 115.

The time-dependent occurrence of failures of a component can also be described by a probability distribution function. A probability density function $f(t)$, the first derivative of the probability distribution function with respect to time, corresponds to the probability distribution for component failures. FIG. 3 is a graph of the probability density function $f(t)$. The probability density function $f(t)$ is normalized so that the area 301 underneath the curve $f(t)$ 303 is 1. The probability that the component will fail within a time interval is the area beneath the probability density function curve 303 within the time interval. For example, the probability that the component will fail between times $t_1$ (305 in FIG. 3) and $t_2$ (307 in FIG. 3) is shown, in FIG. 3, by the crosshatched area 309.

Instantaneous availability, A(t), is the sum of the probability that the component has survived in an operational state without failing until time t, plus the probability that the component has survived in an operational state since its most recent recovery prior to time t, given that one or more failures have occurred prior to time t.

FIG. 4 is a graph of the instantaneous availability A(t) and the steady state availability Ass for a component of a complex system. The instantaneous availability A(t) 401 starts with a value of 1 at time 0, presuming that the component has been correctly installed and verified to be operating correctly, and decreases towards the steady state availability $A_{SS}$ as time increases. In fact, the steady state availability is the limit of the instantaneous availability with increasing time t:

$$\lim_{t \to \infty} A(t) = A_{ss}$$

It can be mathematically shown that while instantaneous availability depends on the nature of both the failure time and recovery time distributions, steady state availability depends only on the means of the failure and recovery time distributions.

The hardware components of the system can sometimes be rigorously tested in order to obtain reasonably precise estimates of the MTTF of the components. Alternatively, the MTTF of the components can be empirically determined from either field failure rate data of the same or similar components, or predicted from models based on the physics of the design of the components. In either case, the reliability and expected lifetimes of hardware components are relatively well characterized, in general. The availability of the hardware components of a complex system can be determined by methods that will be discussed in greater detail, below.

System availability calculations are not simple linear combinations of terms related to component failure and recovery rates. Moreover, methods for determining overall system availability are currently applied to complex systems primarily with respect to the hardware-component contribution, without considering many other types of complex system failure modes.

Knowing the purely hardware-component-failure behavior of a complex system is an important part of determining the overall availability of the complex system, but is only one part of a complex calculation. Other types of failures include failures of various software components, including OSs, DBMSs, and application programs. Complex systems may also be unavailable due to planned maintenance of both hardware and software components, other planned and unplanned events, such as operator errors, and to various types of catastrophic events. A significant problem, recognized by system administrators, system manufacturers, and system configuration experts, is that the precision with which hardware reliability can be determined is currently not available for determining the reliability of software components, in general. Furthermore, current availability-assessment tools do not provide a deterministic method for combining relatively precise hardware-component reliability data with far less precise software-component reliability data and data related to other types of events and activities that contribute to overall system downtime. Instead, overall availability assessments currently result from rather non-deterministic and non-uniformly applied estimations. Users of complex computer systems and other electronic systems, system designers, system manufacturers, system administrators, and system configuration professionals have recognized the need for a deterministic and accurate method and system for assessing the overall availability of complex computer systems and other complex electronic systems.

SUMMARY OF THE INVENTION

One embodiment of the present invention is a semi-automated availability-assessment system and method. An availability assessment is requested by a system planner, system administrator, or other individual or entity interested in assessing the availability of a computer system or other complex electronic system. In response to the request for an availability assessment, a comprehensive questionnaire is returned to the requester that allows the requester to provide detailed information about the hardware components and hardware configuration of the system, software components and software configuration of the system, including estimations and data related to software-component reliability and the MTTRs for software components, and data related to maintenance and other planned and unplanned events that result in system downtime.

The information contained in a returned questionnaire is processed in several steps. First, hardware component and operating system configuration information is extracted in order to conduct a Markov-chain availability analysis of the overall system for unplanned sources of downtime. The results of the Markov-chain availability analysis represent a first intermediate result. Application and database software configuration information, along with data and estimates related to failure and recovery rates, and information related to other sources of unplanned downtime, are extracted from the questionnaire and compiled together to form a second intermediate result. Information related to planned downtime, such software upgrades, hardware maintenance, etc., is extracted from the questionnaire and compiled together as a third intermediate result. When particular types of information are not included in the completed questionnaire, an incomplete intermediate result may be produced, one or more intermediate results may be omitted, or default 1 values may be used until more accurate values can be developed. Additional types of availability-related information may be included in the completed questionnaire, and may be extracted to create additional intermediate results. The grouping of derived results into various intermediate results may be more elaborate, but usually has the unplanned and planned downtime major categories as described above.

The intermediate results are combined in a deterministic manner to produce a final availability assessment for the system. In one embodiment of the present invention, the intermediate results are input into a spreadsheet program, or other similar computational platform, by which the intermediate results can be processed according to various formulas and algorithms to produce a final overall system availability assessment. While many of the steps may be fully or partially automated, the system and methodology of the described embodiment of the present invention may also include input of expert opinion and expert analysis. Furthermore, the availability assessment may be developed through two or more iterations of the basic availability-assessment methodology, including incorporating additional client input, additional expert opinion, and modifying data, assumptions, formulas, and expressions by which intermediate results are produced and a final comprehensive availability assessment is determined.

DETAILED DESCRIPTION OF THE INVENTION

One embodiment of the present invention is a system-availability-assessment method and system for complex electronic systems, such as computer systems. The system-availability-assessment method and system relies on information returned in a questionnaire from a client seeking an availability assessment for a system, as well as on hardware-component reliability data, expert opinion, and intermediate-result calculation and combination techniques in order to iteratively produce an overall system-availability assessment. A combined system-hardware and operating-system availability that takes into account sources of unplanned downtime from either hardware or operating system failure events is, in the described embodiment, computed via continuous-time-Markov-chain availability analysis, described in a first subsection, below. Other sources of unplanned downtime, such as networking failures, application software failures, database faults, operator error, and catastrophic events, as well as sources of planned downtime, such as hardware upgrades, software updates, and database reconfiguration, are collected and compiled into various intermediate result tables, described below in a second subsection. The various intermediate results, including the Markov-chain-assessment-availability-analysis results, are then combined together to produce an overall system availability assessment, described below in a third subsection. A flow-control-diagram description of the method of the described embodiment of the present invention is provided in a fourth subsection, below.

Continuous-Time-Markov-Chain-Availability Assessment

Markov-chain availability analysis employs the well-known continuous-time-Markov-chain ("CTMC") technique to model overall system availability based on the failure rates and recovery rates of components that together compose a system. The system is modeled as a set of discrete states that the system can inhabit. At any given instant in time, the system inhabits one of the various possible system states. State transitions occur over a continuous interval of time.

Figure 1:
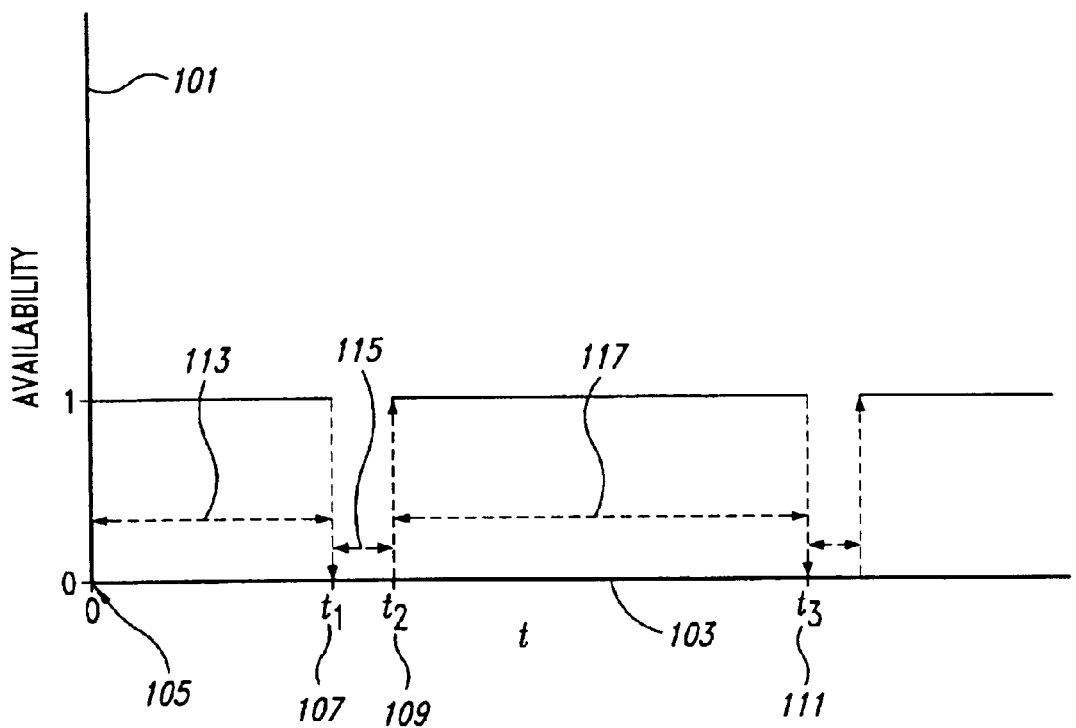
FIG. 1 is a graphical representation of the time-dependent operation of a system component.
Figure 2:
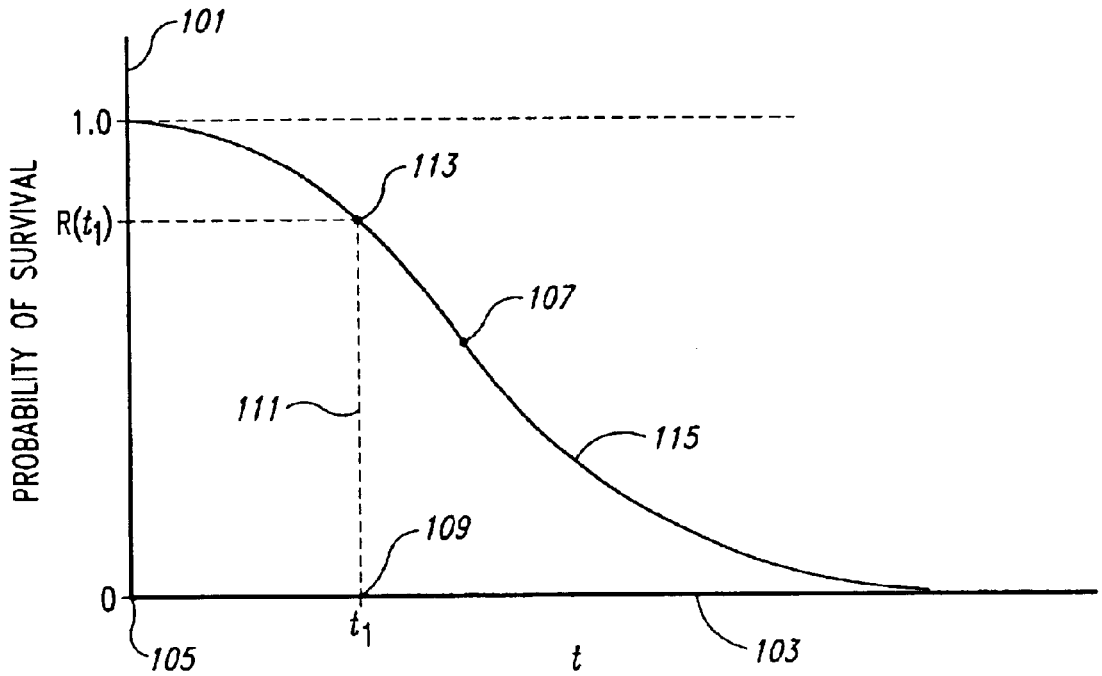
FIG. 2 is a graphical representation of component reliability.
Figure 3:
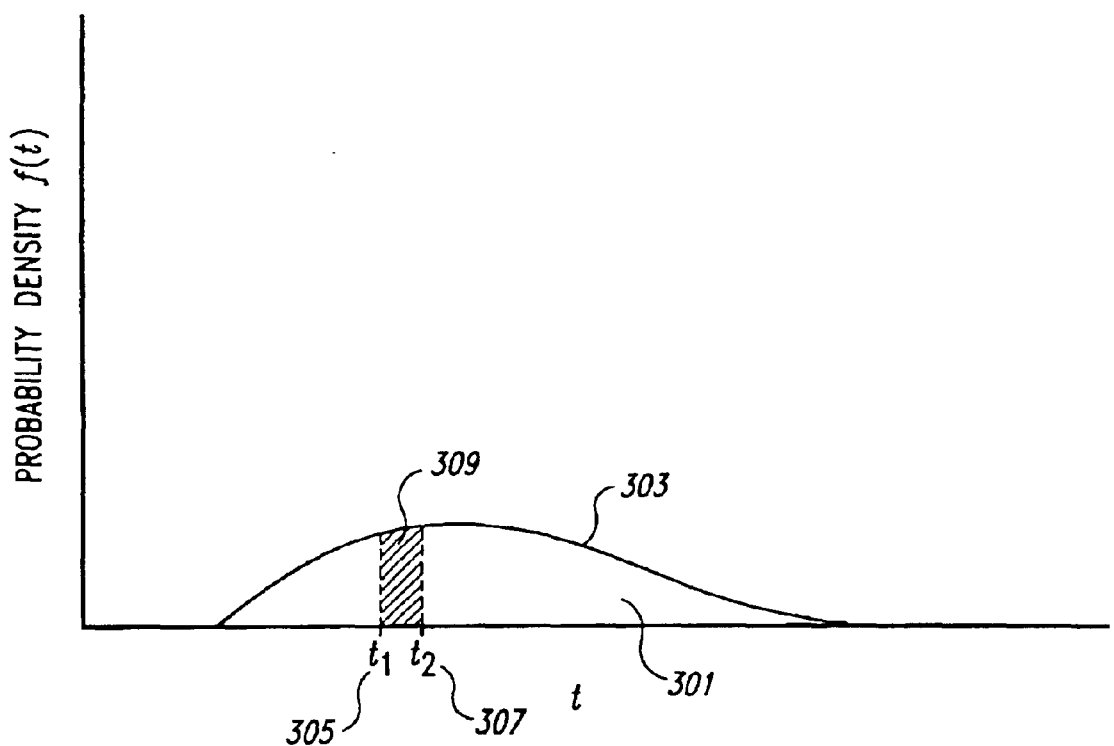
FIG. 3 is a graph of the probability density function $f(t)$.
Figure 4:
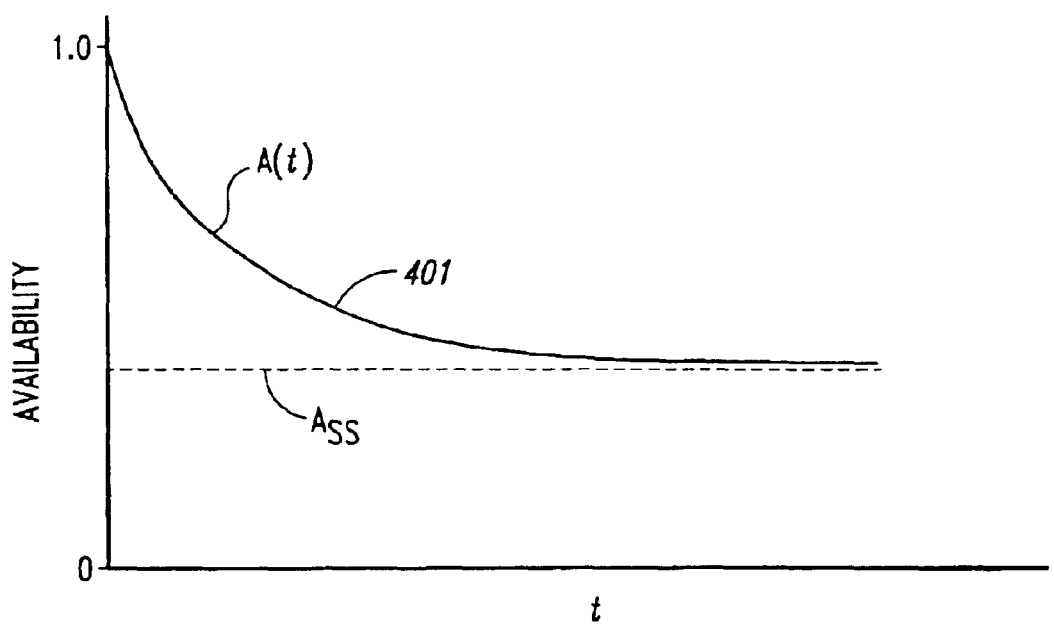
FIG. 4 is a graph of the instantaneous availability $A(t)$ and the steady state availability $A_{ss}$ for a component of a complex system.
Figure 5:
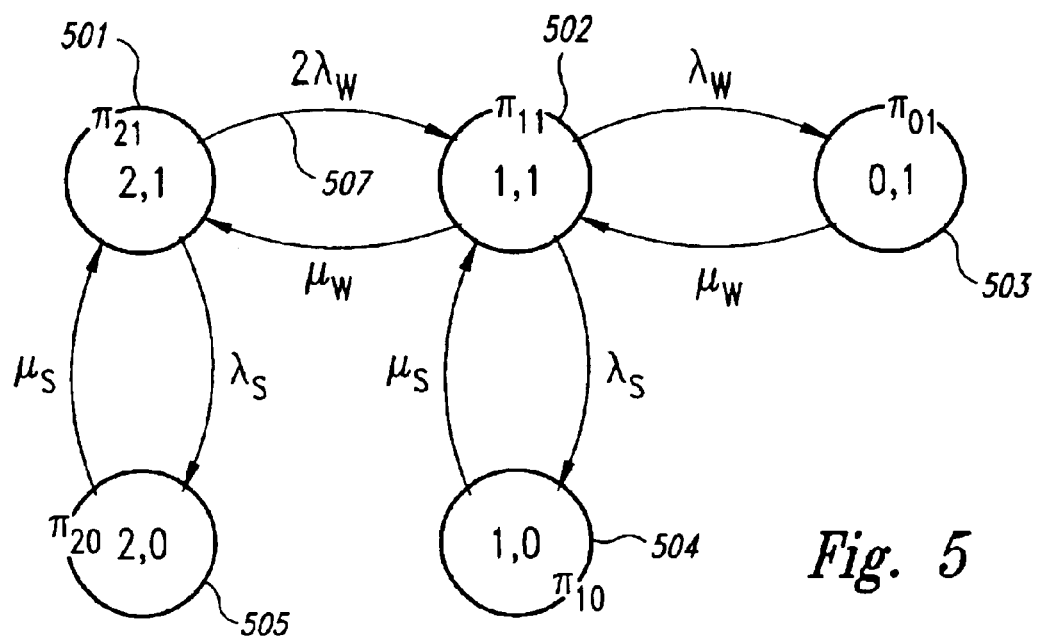
FIG. 5 illustrates a state-space model for a simple computer system.

FIG. 5 illustrates a state-space model for a simple computer system. The computer system includes a file server computer and two workstations linked to the file server computer. The state of the system can be expressed by a pair of integers, the first integer representing the number of workstations currently operational, and the second integer representing whether or not the server computer is operational. An operational state is represented by the integer "1" and a failed, or non-operational, state is represented by integer "0." Thus, the system state "2,1" is a state in which both workstations and the file server computer are operational, the system state "1,1" represents a state in which one workstation is operational, one workstation has failed, and the file server computer is operational, and the system state "1,0" represents a state in which one workstation is operational, one workstation is non-operational, and the file server computer is non-operational. Five states relevant to an availability assessment are shown as circles 501–505 in FIG. 5. The integer-pair state description for each state is centered within the circle representing the state. For example, circle 501 represents the system state "2,1." Each state is associated with a steady-state probability that, at a given point in time, the system inhabits that state. For example, system state "2,1" 501 is associated with the steady-state probability "$\pi_{21}$."

State transitions are represented in FIG. 5 by curved arrows. For example, curved arrow 507 represents a transition from system state "2,1" to system state "1,1." Each transition is associated with a rate. Transitions representing component failures have rates designated by the symbol "$\lambda$" and transitions representing component recovery have rates represented by the symbol "$\mu$." Thus, for example, the rate associated with transition 507, representing failure of one of the two workstations, has the rate "$2\lambda_w$" which is twice the failure rate of a single workstation "$\lambda_w$." The rate of failure of the file server computer is represented as "$\lambda_f$," the rate of recovery of the file server computer is represented as "$\mu_f$," and the rate of recovery of a workstation is represented as "$\mu_W$." A mathematical entity prominent in continuous-time Markov-chain availability analysis is the infinitesimal generator matrix Q. Elements of this matrix are defined as follows:

$q_{ij}(i \neq j)$: transition rate from state $i$ to state $j$ $q_{ii} = -q_i = -\Sigma_{j \neq i} q_{ij}$, the diagonal elements The infinitesimal generator matrix Q for the state space illustrated in FIG. 5 is thus:

$$Q = \begin{bmatrix} -(\lambda_f + 2\lambda_W) & \lambda_f & 2\lambda_W & 0 & 0 \\ \mu_f & -\mu_f & 0 & 0 & 0 \\ \mu_W & 0 & -(\mu_W + \lambda_f + \lambda_W) & \lambda_f & \lambda_W \\ 0 & 0 & \mu_f & -\mu_f & 0 \\ 0 & 0 & \mu_W & 0 & -\mu_W \end{bmatrix}$$

A steady-state probability vector for the states of the state space illustrated in FIG. 5 is:

$$\pi = (\pi_{21}, \pi_{20}, \pi_{11}, \pi_{10}, \pi_{01})$$

Several relationships hold for the above-defined mathematical quantities:

$$\pi Q = 0$$

$$\sum_{i,j} \pi_{ij} = 1$$

The sum of the probabilities associated with all states must equal 1, since the system must reside in exactly one of the possible states at any particular point in time, thus $$\sum_{i,j} \pi_{ij} = 1.$$

Also, in order for steady-state conditions to exist, the rate of transitions into a particular state must equal the rate of transitions out of that state, which can be written as $\pi Q=0$. The resulting system of linear equations can then be solved for the $\pi_{ij}$, each expressed as a function of the system component failure and recovery rates.

In the model illustrated in FIG. 5, states 501 and 502, in which the file server computer is operational and at least one workstation is operational, are considered available states. The remaining states represent non-operational states for the system as a whole, and therefore represent states in which the system is unavailable. The steady state availability for the system is then:

$$A_{SS} = \pi_{(2,1)} + \pi_{(1,1)}$$

In addition to calculating steady state availability, the weighted average failure and recovery rates for the system as a whole are often calculated using the $\pi_{ij}$ quantities as weights. For example, for the system illustrated in FIG. 5, the weighted average or equivalent failure rate can be calculated as:

$$(\pi_{(2,1)}/\pi_{(2,1)} + \pi_{(1,1)})^* \lambda_f + (\pi_{(1,1)}/\pi_{(2,1)} + \pi_{(1,1)})^* (\lambda_f + \lambda_w)$$

The expected annual system downtime ("EADT") can also be calculated in a similar manner using the steady state probabilities. For the example illustrated in FIG. 5, the EADT, expressed in hours, is: $(\pi_{(2,1)}+\pi_{(1,1)})*8760$ hours/year.

The failure and recovery rates for many hardware components are known with reasonably high precision. The failure rates are generated by exhaustive component testing as well as by various theoretical calculations that have been refined over many years of hardware-component quality control. Failure rates for the operating system are often available in a similar manner. The recovery rate values for hardware components and the operating system may comprise fairly precise, manufacturer-supplied data as well as client-supplied data related to the client's ability to detect and access repair services, and client-observed reliabilities related to the client's system environment and to other client-related considerations. A Markov-chain modeling analysis can provide reasonably accurate assessments for the hardware and operating-system contributions to unplanned system downtime.

Additional Intermediate Results

Figure 6:
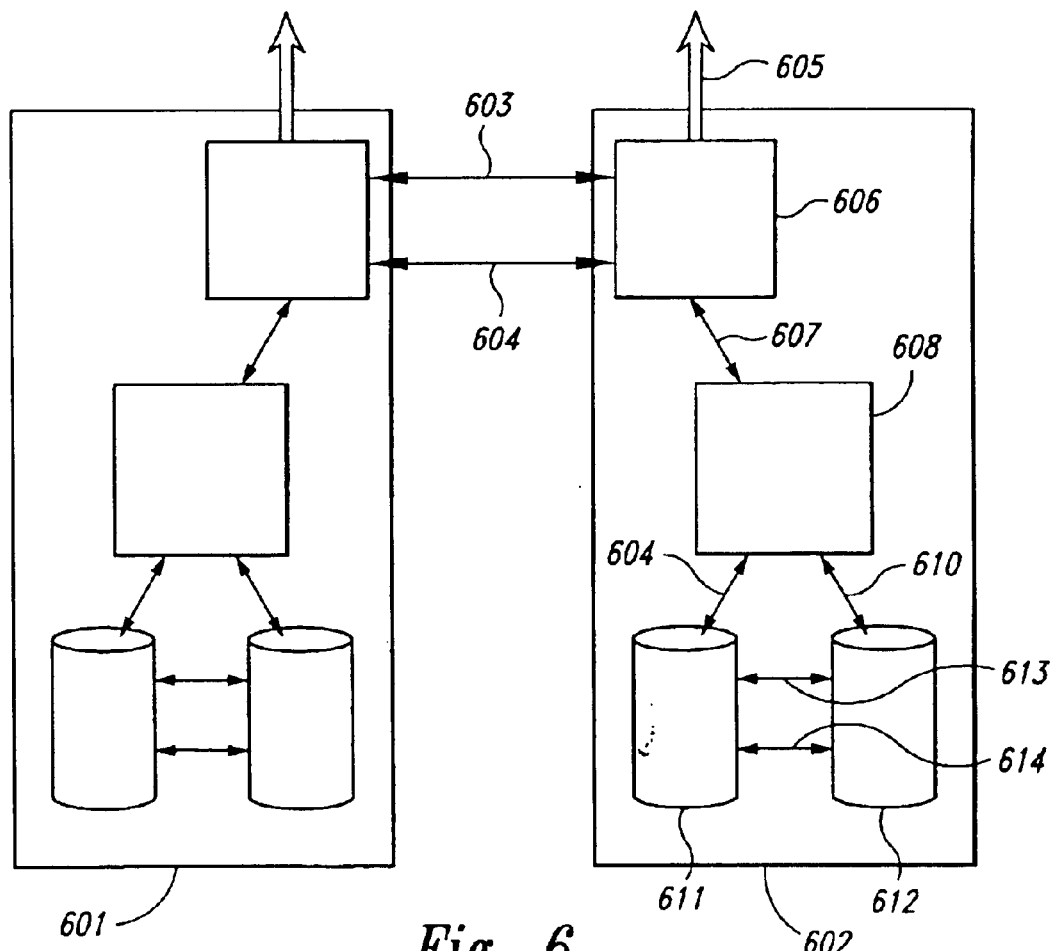
FIG. 6 illustrates the hardware layer of an example computer system.

In this and following subsections, an example computer system is employed for describing the availability-assessment method that represents one embodiment of the present invention. FIG. 6 illustrates the hardware layer of an example computer system. The example system includes two mirrored computing centers 601 and 602. The two computing centers 601 and 602 are internally interconnected by two separate inter-center communications interconnects 603 and 604. The two centers 601 and 602 are exact mirrors of one another. In the interest of brevity, the internal components of only one center 602 will be described. A center includes a center-to-users communications link 605. This link may represent Internet-based communications or another such communications medium. User requests are received and processed within a front-end server computer 606. Processing of user requests generate internal transactions that are passed through a front-end-server-to-back-end-server link 607 to a back-end server 608 for processing. The back-end server is, in turn, linked through two back-end-server-to-disk-array links 609 and 610 to two different disk arrays 611 and 612 that mirror data managed by a DBMS running on the backend server 608. The two disk arrays 611–612 are interconnected by two disk-array interconnect links 613 and 614. Thus, the entire system comprising centers 601 and 602 is reasonably fault tolerant and relatively highly available. One center can fail without causing the entire system to fail, because user requests can be routed to the other "hot-standby" center. A disk array may fail within a center, but DBMS activity may still continue using mirrored data on the surviving disk array.

Figure 7:
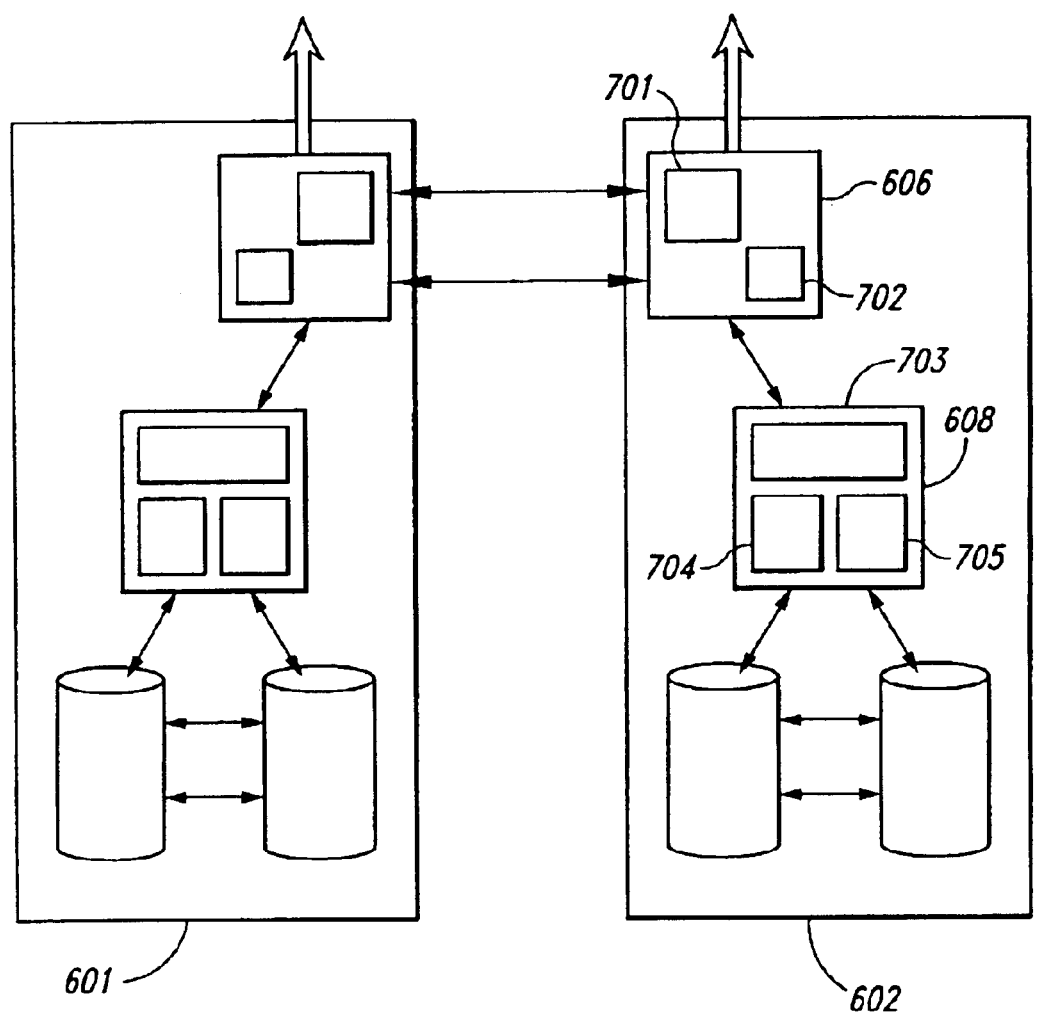
FIG. 7 illustrates software components of the example computer system illustrated in FIG. 6.

FIG. 7 illustrates software components of the example computer system illustrated in FIG. 6. Again, as with FIG. 6, software components are identical in the two different centers 601 and 602, and are therefore described with respect to only center 602. The front-end server 606 runs a front-end application 701 on top of a front-end OS 702. The back-end server 608 runs a back-end application 703 in parallel with a DBMS 704, both on top of a back-end OS 705.

As discussed in the previous subsection, a Markov-chain availability analysis may be performed on the hardware and operating-system components of the two-center system illustrated in FIG. 7. The input data for the Markov-chain analysis includes hardware and operating system configuration data supplied by the client requesting the availability assessment, hardware-component and operating-system failure and recovery rate data provided by system suppliers and optionally supplemented by client-specific data. Client-specific data may take into account a client's ability to detect and diagnose component failures in a timely fashion, the turn-around times for component repair, in-house repair capabilities, and other such considerations. The Markov-chain analysis is employed to produce a relatively accurate availability analysis for sources of unplanned downtime due to hardware and operating system causes. Additional derived results may be calculated as well in a variety of different ways. Table 1, below, provides example combined hardware and operating-system availability results, due to unplanned causes, for the example system shown in FIGS. 6 and 7. Thus, Table 1 represents a first intermediate result in the overall availability assessment carried out by one embodiment of the present invention. Note that, in Table 1, one or more components, such as a disk array, may be unavailable, yet the site may still be available, for example, because of the mirrored disk configuration. Similarly, while the primary site may be unavailable, the service as perceived by a user connected to the system via the Internet might still be available because the service has quickly switched-over to a hot-standby site. Thus, high availability aspects of the system design that affect availability, beyond component failure and recovery rates, can be modeled using the Markov-chain analysis method.

TABLE 1

| site | component | # | Failures/year | MTTR | downtime/year | site availability | service availability |
|---|---|---|---|---|---|---|---|
| center 1 | | | | | | | |
| | front-end server & OS | 1 | .10 | 1.5 | .15 | | |
| | back-end server & OS | 1 | .25 | 1.7 | .425 | | |
| | server interconnect | 1 | .001 | .5 | .0005 | | |
| | disk array | 2 | .05 | 2.5 | .25 | | |
| | back-end/disk int. | 2 | .001 | .5 | .001 | | |
| | disk array int. | 2 | .001 | .5 | .001 | | |
| | center/user link | 1 | .001 | .5 | .0005 | 99.9978% | |

TABLE 1-continued

| site | component | # | Failures/year | MTTR | downtime/year | site availability | service availability |
|---|---|---|---|---|---|---|---|
| center 2 | | | | | | | |
| | front-end server & operating system | 1 | .10 | 1.5 | .15 | | |
| | back-end server & operating system | 1 | .25 | 1.7 | .425 | | |
| | server interconnect | 1 | .001 | .5 | .0005 | | |
| | disk array | 2 | .05 | 2.5 | .25 | | |
| | back-end/disk int. | 2 | .001 | .5 | .001 | | |
| | disk array interconnect | 2 | .001 | .5 | .001 | | |
| | center/user link | 1 | .001 | .5 | .0005 | 99.9978% | |
| | inter-center interconnect | 2 | .001 | .5 | .001 | | |
| Marker Results for total system | | | .352 | .02 | .00704 | | 99.9999% |

As discussed above, the overall system can experience unplanned downtime not only due to unplanned hardware and operating-system failures, but also due to unplanned application-software and database-software failures. Unplanned downtime can also arise due to operator error, site power interruption, sitewide disasters, etc. Software-failure and recovery rates may be obtained from a client via a detailed questionnaire and compiled in a semi-automated fashion, using both software tools and expert input. Table 2, below, shows representative results for additional sources of unplanned downtime for the system illustrated in FIG. 7, as a second intermediate result. Note that these additional sources of unplanned downtime have failure and recovery rates that are not usually known with as much certainty as the failure and recovery rates associated with hardware and operating-system components. These additional sources of unplanned downtime may not be included in the Markov-chain models, but may instead be included in a simpler spreadsheet analysis.

TABLE 2

| site | Component | # | failures/year | MTTR | downtime/year | site availability | service availability |
|---|---|---|---|---|---|---|---|
| center 1 | | | | | | | |
| | front-end app | 1 | .05 | 0.1 | .005 | | |
| | back-end app | 1 | .08 | 0.1 | .008 | | |
| | back-end DBMS | 1 | .10 | 0.5 | .05 | | |
| | Operator error | 1 | 2.0 | 4.0 | 8.0 | | |
| | site disaster | 1 | .01 | 72 | .72 | 99.8997% | |
| center 2 | | | | | | | |
| | front-end app | 1 | .05 | 0.1 | .005 | | |
| | back-end app | 1 | .08 | 0.1 | .008 | | |
| | back-end DBMS | 1 | .10 | 0.5 | .05 | | |
| | Operator error | 1 | 2.0 | 4.0 | 8.0 | | |
| | site disaster | 1 | .01 | 72 | .72 | 99.8997% | |
| Marker Results for total system | | | 2.24 | .02 | .0448 | | 99.9995% |

In similar fashion, a client may provide, via a questionnaire, detailed information about various planned maintenance events that contribute to system downtime. Again, this information may be compiled by semi-automated techniques, as well as by expert analysis, into a table of planned-event downtime estimates that represent a third intermediate result in the overall availability assessment. Table 3, below, shows representative planned-event downtime data compiled as an intermediate result for the system illustrated in FIG. 7.

TABLE 3

| site | Component | event | average # of events/year | average event time | Downtime/year | site availability | service availability |
|---|---|---|---|---|---|---|---|
| center 1 | front-end server | os update | 1 | .75 | .75 | | |
| | back-end server | os update | 2 | .75 | 1.5 | | |
| | DBMS | maintenance | 2 | .5 | 1.0 | | |
| | front-end app | update | 1 | .25 | .25 | | |
| | back-end app | update | 1 | .25 | .25 | | |
| | front-end server | hardware update | .5 | 1.5 | .75 | | |
| | back-end server | hardware update | .5 | 1.5 | .75 | 99.9401% | |
| center 2 | | | | | | | |
| | front-end server | os update | 1 | .75 | .75 | | |
| | back-end server | os update | 2 | .75 | 1.5 | | |
| | DBMS | maintenance | 2 | .5 | 1.0 | | |
| | front-end app | update | 1 | .25 | .25 | | |
| | back-end app | update | 1 | .25 | .25 | | |
| | front-end server | hardware update | .5 | 1.5 | .75 | | |
| | back-end server | hardware update | .5 | 1.5 | .75 | 99.9401% | |
| Marker Results for total system | | | 8 | .02 | .16 | | 99.9982% |

Combination of Intermediate Results

The intermediate results discussed above may be ordered and partitioned in many different ways. Various embodiments of the present invention may employ a wide variety of different intermediate results sets that include many different data and derived results. The various embodiments commonly combine system hardware and operating-system availability results, application and database software availability results, availability results due to additional unplanned sources, and availability results due to planned sources, with perhaps other categories related to system downtime, that can be compiled to generate one or more additional intermediate results sets.

Once intermediate availability analysis results sets have been compiled, as discussed in the previous subsection, the various results sets need to be combined together to produce an overall availability estimate. In the described embodiment, data is input into a commonly-available spreadsheet program, and intermediate results generated according to various algorithms and formulas entered into the spreadsheet. The intermediate results are then combined to produce combined results via various combination formulas and combination algorithms. Table 4 logically illustrates one spreadsheet-based combination algorithm for the example illustrated in Tables 1 through 3 above. The algorithm is based on the conservative approach of simply adding up the expected annual downtime contributions from each of the three sources, which corresponds to the assumption that all downtime events from the three major categories are disjoint from one another. Clearly, a more sophisticated Markov-chain model could be developed even for the highest level result combination, if desired.

TABLE 4

| Source | average # of events/year | MTTR formula | downtime/year | service availability |
|---|---|---|---|---|
| unplanned due to hardware and operating system | .352 | .02 | .00704 | 99.9999% |
| unplanned due to application and database software, operator error, site disaster, etc. | 2.24 | .02 | .0448 | 99.9995% |
| planned events due to hardware updates, software updates, database maintenance, etc. | 8 | .02 | .16 | 99.9982% |
| overall results | | | .21184 | 99.9976% |

Many different formulas and combination algorithms may be employed, often depending on an expert's assessment of the quality and reliability of client-supplied data. Different formulas and combination algorithms may be employed, as well, depending on the completeness of information returned in an availability-assessment questionnaire by the client requesting an availability assessment. As discussed previously, many different partitions of failure and recovery rate data may be made in various different embodiments of the present invention. In the described embodiment, data are grouped together into three intermediate-results types. However, failure and recovery rate data may be alternatively partitioned in many different ways into any number of different intermediate-result types.

Figure 8:
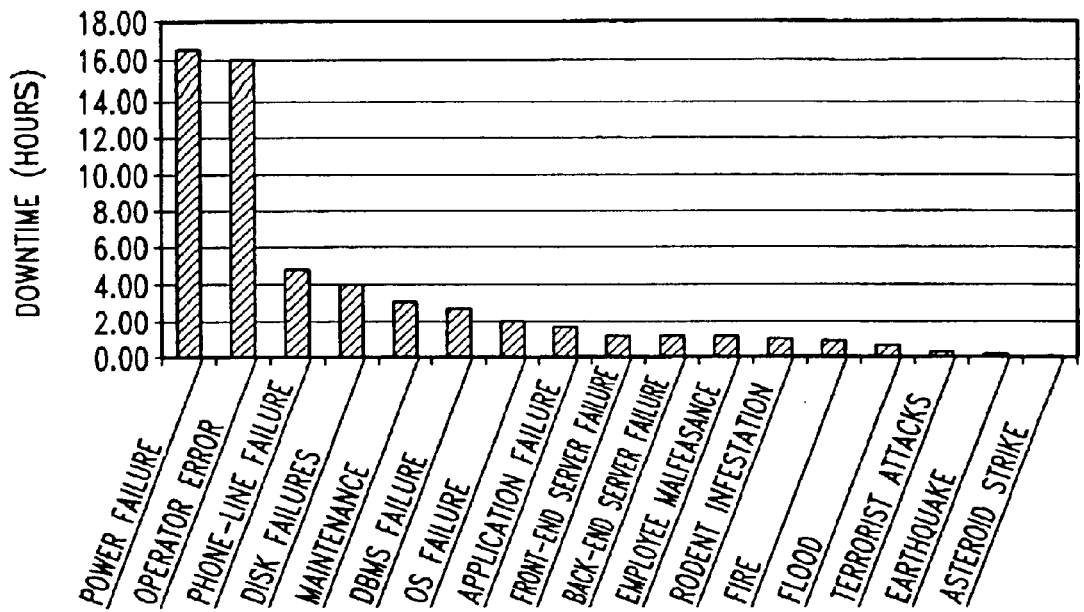
FIG. 8 illustrates graphic display of intermediate availability results.
Figure 9:
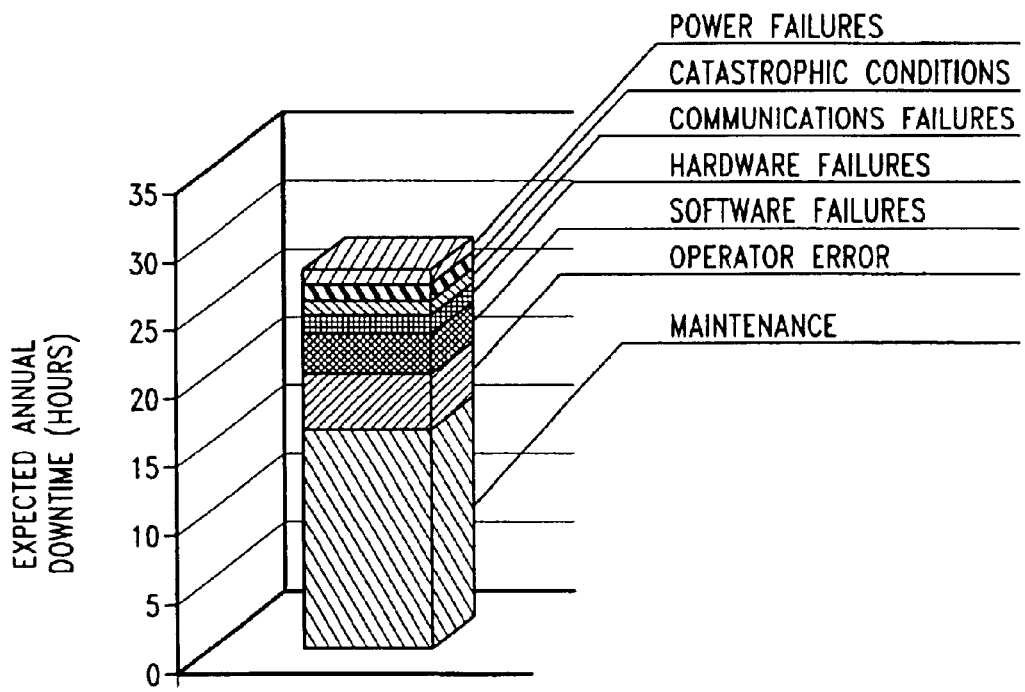
FIG. 9 illustrates graphic display of intermediate availability results.

The various intermediate and combined results may be graphically displayed in order to provide insight to analysts and experts reviewing the results. FIGS. 8 and 9 illustrate graphical display of intermediate availability results.

The availability assessment may be repeated following analysis of the initial availability assessment. Various data may be modified, calculations modified, and new data added, depending on review of the initial availability-related intermediate results and combined results. In addition, the resulting availability results may be used to optimize system configuration and management to produce an optimized system providing greater availability. Proposed optimized systems can be analyzed by performing availability assessment of the proposed optimized systems in order to select optimized systems providing most cost-effective and substantial increases in availability.

Flow-Control Diagram Description

Figure 10:
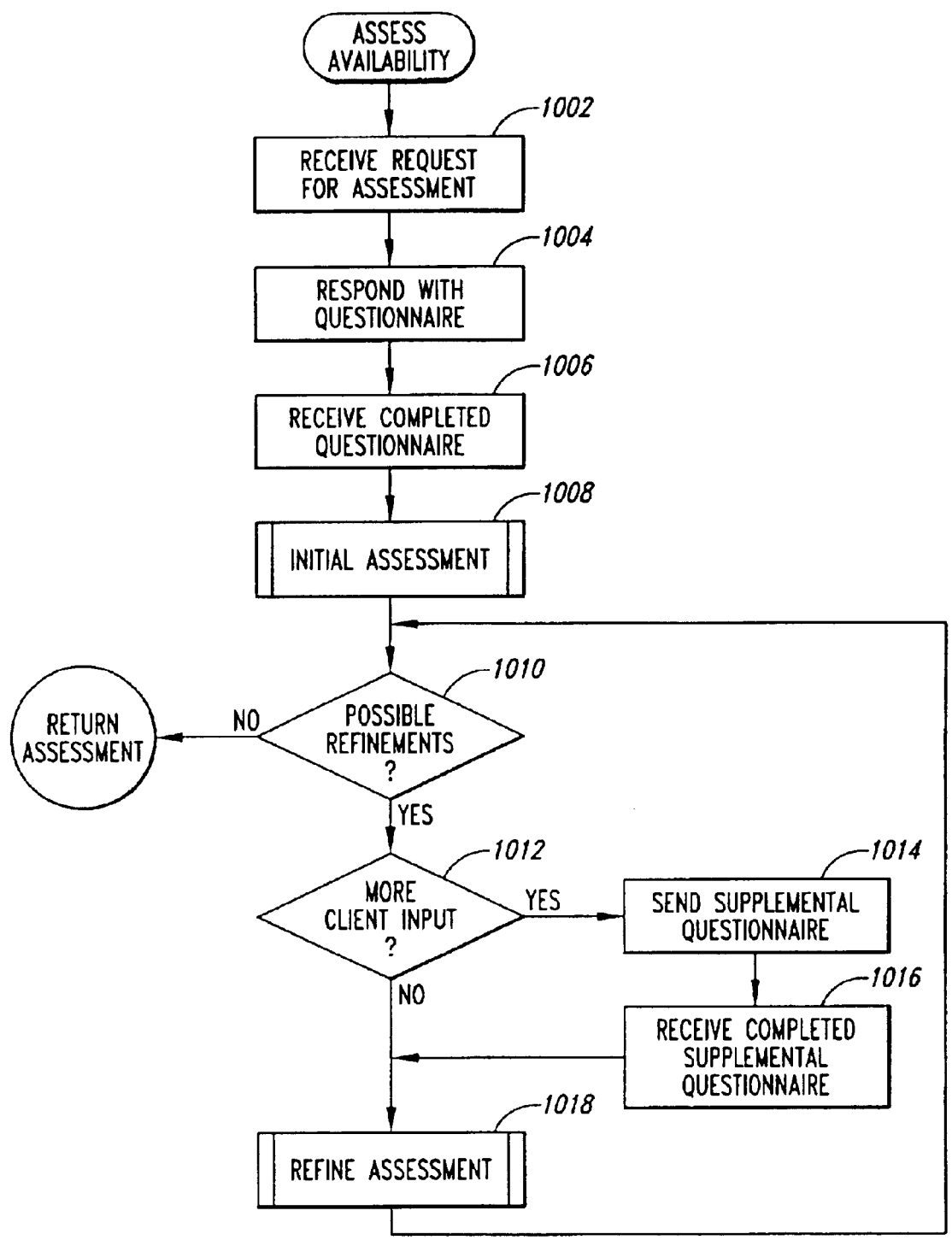
FIG. 10 is a flow-control diagram for one embodiment of the availability assessment method of the present invention.

FIG. 10 is a flow-control diagram for one embodiment of the availability assessment system and method of the present invention. In step 1002, a request is received from the client requesting an assessment of the availability of the client's computer system or other complex electronic system. In step 1004, a questionnaire is returned to the requesting client. In step 1006, the completed questionnaire from the requesting client is received. In step 1008, the routine "initial assessment" is invoked to determine an initial availability assessment for the client's system. Next, in step 1010, a determination is made as to whether the initial availability assessment produced in step 1008 may be refined. If not, then the initial availability assessment is returned. Otherwise, in step 1012, a determination is made as to whether additional client input may be helpful. If so, then, in step 1014, a supplemental questionnaire may be sent to the client and, in step 1016, the computed supplemental questionnaire may be received from the client. Whether or not additional client information is requested and obtained, the procedure "refine assessment" is invoked in step 1018 to refine the initial availability assessment. Following refinement, control flows back to step 1010 to determine whether another availability-assessment iteration needs to be undertaken.

Figure 11:
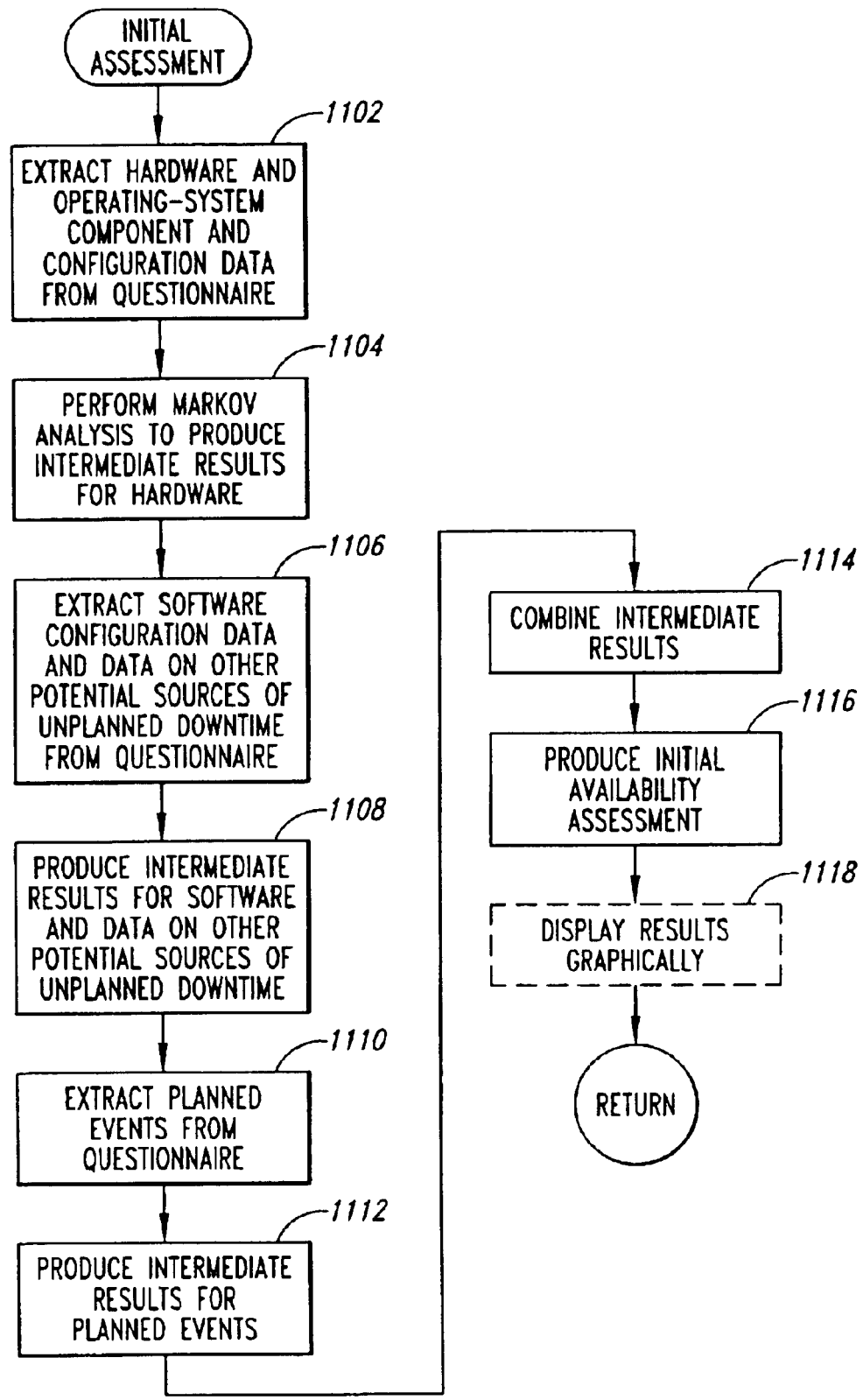
FIG. 11 is a flow-control diagram for the procedure "initial assessment."

FIG. 11 is a flow-control diagram for the procedure "initial assessment" called in step 1008 of FIG. 10. In step 1102, hardware and operating system configuration data is extracted from the questionnaire, and, in step 1104, the extracted hardware and operating-system configuration data is combined with hardware and operating-system failure and recovery rate data provided by manufacturers, and subject to Markov-chain analysis to produce intermediate availability results for the hardware and operating-system layers of a system. In step 1106, application-and-database-software-configuration information, along with associated failure and recovery rate data-, as well as information on other potential sources of unplanned downtime, are extracted from the questionnaire and, in step 1108, compiled to produce intermediate availability results for sources of unplanned downtime for the system. In step 1110, data is extracted from the questionnaire related to planned events leading to system downtime, including maintenance operations and other such events, and, in step 1112, is compiled to produce intermediate availability results for planned events. In step 1114, the various intermediate results are combined via various combination formulas and algorithms, in the described embodiment using a spreadsheet program. In step 1116, the combined availability and reliability results are used to produce an initial availability assessment. In an optional step 1118, the various intermediate results and final combined results may be displayed graphically to facilitate expert analysis of the initial availability assessment.

Figure 12:
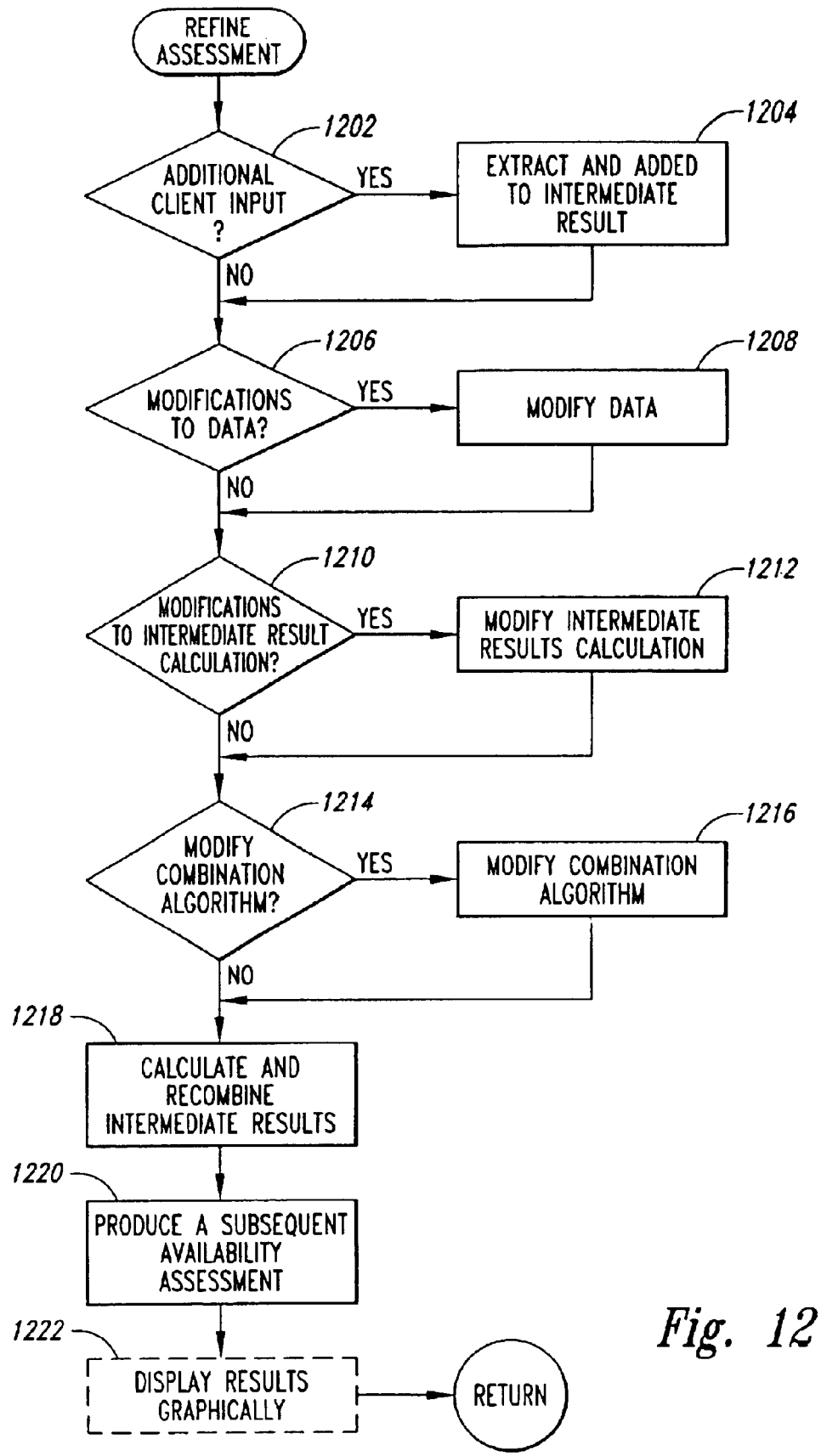
FIG. 12 is a flow-control diagram for the procedure "refine assessment."
Figure 5:
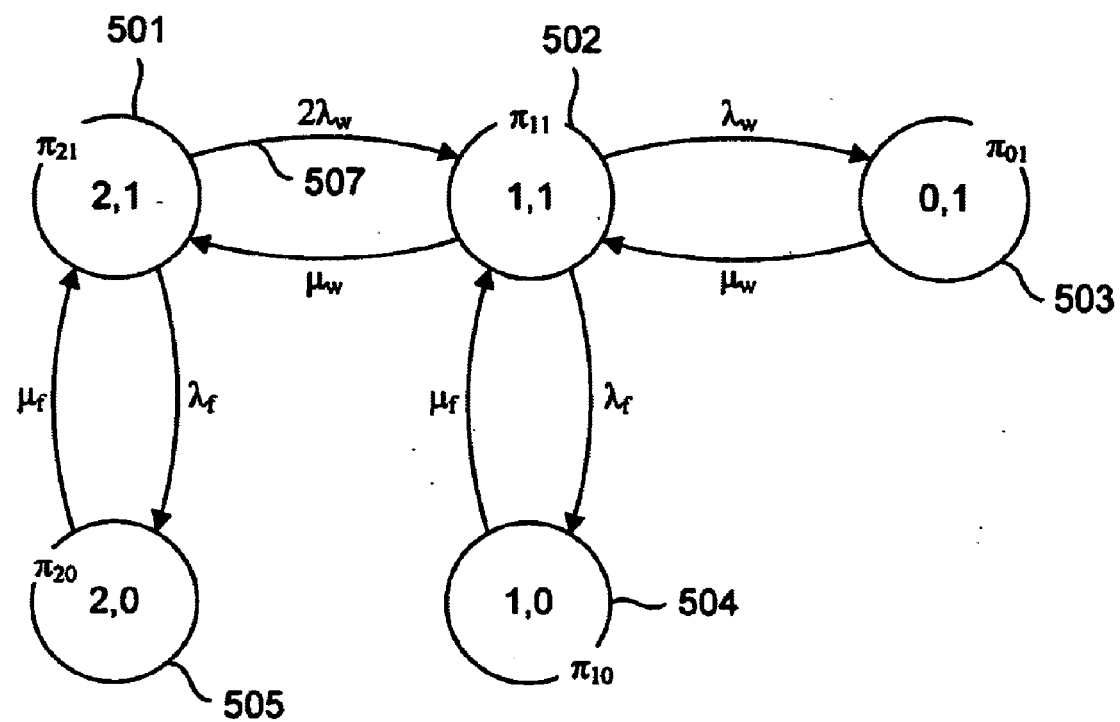
Figure 7:
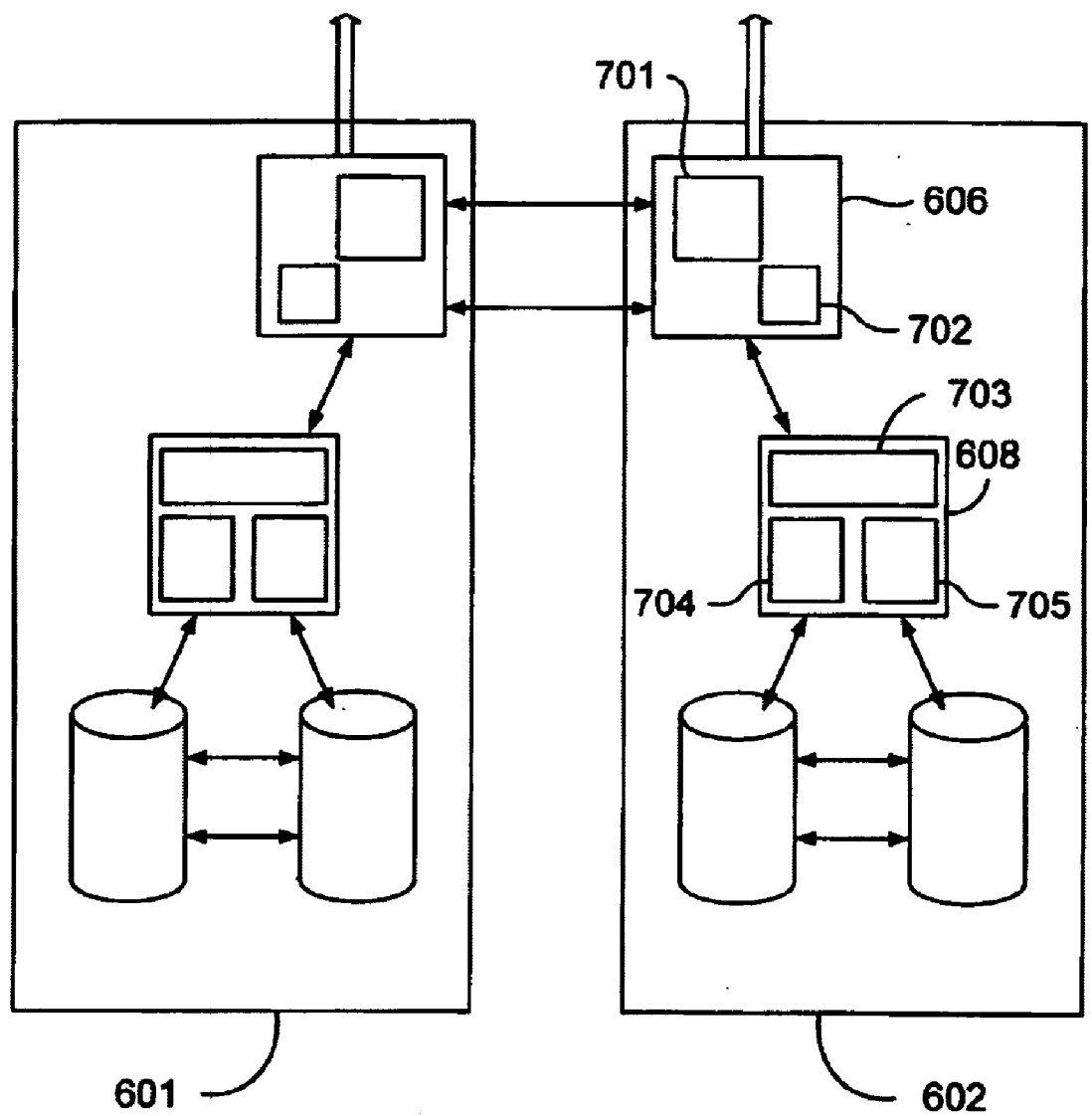

FIG. 12 is a flow-control diagram for the procedure "refine assessment" called in step 1018 of FIG. 10. In step 1202, a determination is made as to whether additional client input has been obtained via a supplemental questionnaire and, if so, the additional information is extracted and added to the various intermediate result tables or cells within a spreadsheet in step 1204. In step 1206, an expert determines whether or not to modify certain of the data upon which the current availability assessment was made. If the expert decides to modify data, the data is modified in step 1208. An expert may identify outlier data that is statistically incompatible with other data provided by the client, may obtain better failure and recovery rate data for various system components, and may decide to modify data for other reasons. In step 1210, an expert decides whether any of the formulas and algorithms employed to produce intermediate results need to be modified. If so, then the intermediate result calculations are modified in step 1212. In step 1214, an expert determines whether any of the intermediate-result combination formulas or algorithms need to be modified and, if so, modifies the combinations formulas and algorithms in step 1216. Finally, following additional data input and modifications, intermediate results are recalculated and recombined in a fashion similar to the calculation and combination of intermediate results illustrated in FIG. 11. In step 1220, a refined, or subsequent, availability assessment is produced from the combined results produced in step 1218 and, in optional step 1222, various intermediate results and combined results may be graphically displayed to facilitate expert analysis of the data.

The refined availability assessment may be supplied to the client to indicate to the client the current availability provided by the client's system. In addition, an expert may optimize any of the configurations, maintenance procedures, components employed in the system, and other such factors in order to direct the client as to steps that the client may take to improve the availability of the client's system. After arriving at an optimized system configuration, the expert may employ the procedure "assess availability" on the optimized system configuration to produce a projected availability for the optimized system. The availability optimization may also take into account optimization costs in order to produce a suggested most-cost-effective method for improving system availability.

Although the present invention has been described in terms of a particular embodiment, it is not intended that the invention be limited to this embodiment. Modifications within the spirit of the invention will be apparent to those skilled in the art. For example, as discussed above, many different types of intermediate results may be derived from different types of data provided by clients in questionnaires and provided by component manufacturers and obtained from other sources. Many algorithms and formulas may be employed for deriving intermediate results and combining intermediate results. Various levels of automation and manual analysis may be employed.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for determining an availability of a complex system, the method comprising:
   receiving information related to system-hardware components and operating-system components and configuration and compiling a first, intermediate, system-availability-related result with respect to the system-hardware components and operating-system components;
   receiving information related to non-operating-system software components and configurations and compiling a second, intermediate, system-availability-related result with respect to the non-operating-system software components and configurations;
   receiving information related to planned system downtimes and compiling a third, intermediate, system-availability-related result with respect to the planned system downtimes;
   combining the first, second, and third intermediate system-availability-related results to produce a combined availability result; and
   determining the availability of the complex system by calculating the availability of the complex system from the combined availability result.

2. The method of claim 1 wherein receiving information related to system-hardware components and operating-system components and configuration and compiling a first, intermediate, system-availability-related result with respect to the system-hardware components and operating-system components further comprises:
   receiving a completed questionnaire that includes information related to system-hardware components and operating-system components and configuration; and
   extracting from the received, completed questionnaire information related to system-hardware components and operating-system components and configuration;
   computing the first, intermediate, system-availability-related result from the extracted information related to system-hardware components and operating-system components and configuration.

3. The method of claim 2 wherein information related to system-hardware components and operating-system components and configuration includes component failure and recovery rates.

4. The method of claim 1 wherein receiving information related to non-operating-system software components and configurations and compiling a second, intermediate, system-availability-related result with respect to the non-operating-system software components and configurations further comprises:
   receiving a completed questionnaire that includes information related to non-operating-system software components and configurations;
   extracting from the received, completed questionnaire information related to non-operating-system software components and configurations; and
   computing the second, intermediate, system-availability-related result from the extracted information related to non-operating-system software components and configurations.

5. The method of claim 4 wherein information related to non-operating-system software components and configurations includes information related to component failure and recovery rates for application software and database components and configurations.

6. The method of claim 1 wherein receiving information related to planned system downtimes and compiling a third, intermediate, system-availability-related result with respect to the planned system downtimes further comprises:
   receiving a completed questionnaire that includes information related to planned system downtimes;
   extracting from the received, completed questionnaire information related to the planned system downtimes; and
   computing the third, intermediate, system-availability-related result from the extracted information related to the planned system downtimes.

7. The method of claim 1 wherein the information related to system-hardware components and operating-system components and configuration is combined with hardware and operating-system component failure and recovery rate data and input into a Markov-chain analysis in order to compute the first intermediate availability.

8. The method of claim 1 wherein received information is input into a spreadsheet program that includes algorithm specifications for computing intermediate, system-availability-related results, for combining intermediate, system-availability-related results to produce the combined availability result, and for calculating the availability of the complex system from the combined availability result.

9. The method of claim 1 further including, prior to determining the availability of the complex system by calculating the availability of the complex system from the combined availability result:
   receiving additional data and re-computing an intermediate, system-availability-relates result; and
   re-combining the re-computed intermediate, system-availability-related result with previously computed, intermediate, system-availability-related results to produce a refined combined availability result; and
   calculating the availability of the complex system from the refined combined availability result.

10. The method of claim 1 further including, prior to determining the availability of the complex system by calculating the availability of the complex system from the combined availability result:
   modifying data and re-computing an intermediate, system-availability-related result;
   re-combining the re-computed intermediate, system-availability-related result with previously computed, intermediate, system-availability-related results to produce a refined combined availability result; and calculating the availability of the complex system from the refined combined availability result.

11. The method of claim 1 further including, prior to determining the availability of the complex system by calculating the availability of the complex system from the combined availability result:

modifying an algorithm specification for computing an intermediate, system-availability-related result and re-computing the intermediate, system-availability-related result;

re-combining the re-computed intermediate, system-availability-related result with previously computed, intermediate, system-availability-related results to produce a refined combined availability result; and calculating the availability of the complex system from the refined combined availability result.

12. A set of computer instructions, encoded in a computer-readable medium, that direct a computer to:

receiving information related to system-hardware components and operating-system components and configuration and compiling a first, intermediate, system-availability-related result with respect to the system-hardware components and operating-system components;

receiving information related to non-operating-system software components and configurations and compiling a second, intermediate, system-availability-related result with respect to the non-operating-system software components and configurations;

receiving information related to planned system downtimes and compiling a third, intermediate, system-availability-related result with respect to the planned system downtimes;

combining the first, second, and third intermediate system-availability-related results to produce a combined availability result; and determining the availability of the complex system by calculating the availability of the complex system from the combined availability result.

13. A complex-system availability, encoded in a computer readable or human-readable medium, determined by:

receiving information related to system-hardware components and operating-system components and configuration and compiling a first, intermediate, system-availability-related result with respect to the system-hardware components and operating-system components;

receiving information related to non-operating-system software components and configurations and compiling a second, intermediate, system-availability-related result with respect to the non-operating-system software components and configurations;

receiving information related to planned system downtimes and compiling a third, intermediate, system-availability-related result with respect to the planned system downtimes;

combining the first, second, and third intermediate system-availability-related results to produce a combined availability result; and determining the availability of the complex system by calculating the availability of the complex system from the combined availability result.

14. A first system for determining an availability of a second, complex system, the first system comprising:

a means for soliciting and receiving information related to system-hardware components and operating-system components and configuration, non-operating-system software components and configurations, and planned system downtimes for the second, complex system;

a means for computing
a first, intermediate, system-availability-related result with respect to the system-hardware components and operating-system components,
a second, intermediate, system-availability-related result with respect to the non-operating-system software components and configurations, and
a third, intermediate, system-availability-related result with respect to the planned system downtimes;

a means for combining the first, second, and third intermediate system-availability-related results to produce a combined availability result; and a means for determining the availability of the second, complex system by calculating the availability of the second, complex system from the combined availability result.

15. The system of claim 14 wherein the means for soliciting and receiving information related to system-hardware components and operating-system components and configuration, non-operating-system software components and configurations, and planned system downtimes includes:

sending a questionnaire soliciting information related to system-hardware components and operating-system components and configuration, non-operating-system software components and configurations, and planned system downtimes;

receiving a completed questionnaire that includes information related to system-hardware components and operating-system components and configuration, non-operating-system software components and configurations, and planned system downtimes; and extracting from the received, completed questionnaire information related to system-hardware components and operating-system components and configuration, non-operating-system software components and configurations, and planned system downtimes.

16. The system of claim 14 wherein the means for computing a first, intermediate, system-availability-related result with respect to the system-hardware components and operating-system components, a second, intermediate, system-availability-related result with respect to the non-operating-system software components and configurations, and a third, intermediate, system-availability-related result with respect to the planned system downtimes comprises a spreadsheet program initialized with computational formulas.

* * * * *

UNITED STATES PATENT AND TRADEMARK OFFICE
CERTIFICATE OF CORRECTION

PATENT NO. : 6,895,533 B2
DATED : May 17, 2005
INVENTOR(S) : Gray et al.

It is certified that error appears in the above-identified patent and that said Letters Patent is hereby corrected as shown below:

Drawings,
Figure 5, replace with attached corrected drawing sheet.
Figure 7, replace with attached corrected drawing sheet.

Signed and Sealed this

First Day of November, 2005

JON W. DUDAS
*Director of the United States Patent and Trademark Office*